Figure 1:
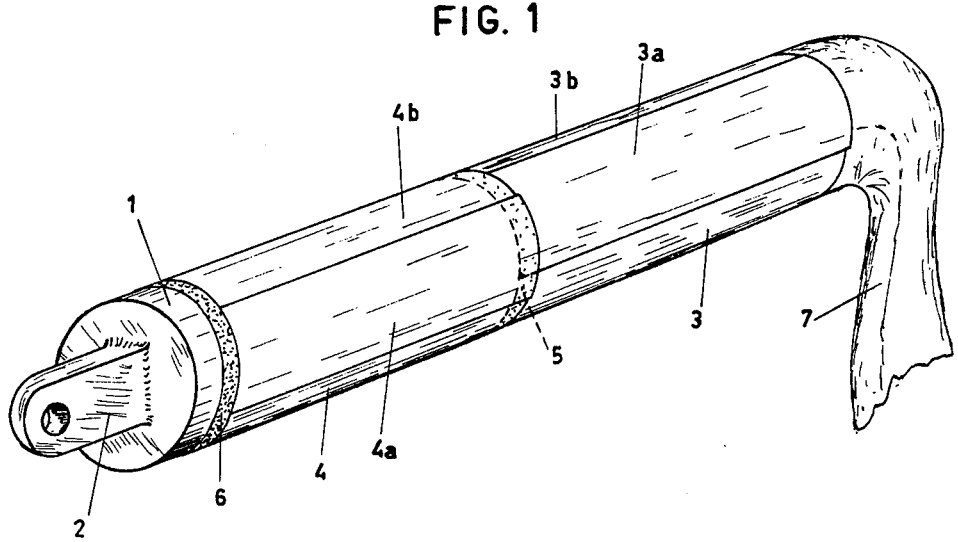

United States Patent [19]

Vaessen

[11] 4,006,258
[45] Feb. 1, 1977

[54] PROCESS FOR PRODUCING SAUSAGE CASINGS

[75] Inventor: Hubert J. Vaessen, Deventer, Netherlands

[73] Assignee: H. Vaessen B.V., Deventer, Netherlands

[22] Filed: Dec. 9, 1974

[21] Appl. No.: 531,099

[30] Foreign Application Priority Data

Dec. 12, 1973 Netherlands .................... 7317064

[52] U.S. Cl. .................... 426/272; 426/140; 426/274; 426/390; 426/420
[51] Int. Cl.² .................... A23L 1/31; A22C 13/00
[58] Field of Search ............ 426/140, 92, 143, 272, 426/274, 302, 390, 420; 99/176, 175; 428/36, 57, 473; 156/218

[56] References Cited

UNITED STATES PATENTS

| | | | |
|---|---|---|---|
| 1,699,076 | 1/1929 | Mumm | 426/140 |
| 2,210,070 | 8/1940 | Field | 156/218 X |
| 2,890,121 | 6/1959 | Rinehart | 426/140 |
| 2,977,233 | 3/1961 | Vaessen | 426/140 |
| 3,214,277 | 10/1965 | Vaessen | 426/92 |

FOREIGN PATENTS OR APPLICATIONS 19,496  4/1913  United Kingdom .............. 426/140

*Primary Examiner*—Robert Halper
*Attorney, Agent, or Firm*—Browdy and Neimark

[57] ABSTRACT

A process for producing sausage casings is provided, wherein strips of intestine which have been rendered porous and sticky are joined with overlapping edges on a mandrel, and dried, at least the edge of the stuck product being dried and its stickiness being decreased only to the extent that the intestine material can be moved along the mandrel as a tube, whereafter the operation is repeated using this edge as joining element, and after the desired length of casing has been obtained, the still sticky part thereof is dried completely. If desired, casings can be made of two layers of strips or of one layer of strips with a proteinaceous coating in which case in each sticking operation a single-layer edge is used as joining element, while furthermore, a netting can be applied between two layers of intestine strips or between such a layer and a proteinaceous coating.

8 Claims, 2 Drawing Figures

U.S. Patent

Feb. 1, 1977

4,006,258

PROCESS FOR PRODUCING SAUSAGE CASINGS

It has been known for a long time (vide Dutch patent specification 62,435) that sausage casings can be produced from intestines which per se are unsuitable for that purpose, by subjecting the intestines to an acid or lye treatment which renders them porous and sticky, and by cutting them open, after which the sticky intestine strips so obtained are put together with overlapping edges on a mandrel, for obtaining a tubular casing, if desired with one closed end. Further, it is known from the Dutch patent specification 120,744 that for many purposes it is necessary to stick a second layer onto the intestine layer so obtained on the mandrel, because insufficient strength is obtained otherwise. As an alternative, according to the last-mentioned patent specification it is also possible to use a single intestine layer with animal proteinaceous material, particularly collagen obtained from skin tissue. On the other hand, for some purposes, such as "saucisse de Bologne" or "Landjager", where the sausage casing is stuffed while enclosed by a stiff mold (vide for example the Austrian patent specification 207,282 and the Belgian patent specification 610,778) it is also possible to use sausage casings consisting of only a single layer of intestine strips without a coating. In all these cases, the sausage casing after assembly on the mandrel is fully dried on the mandrel too, which causes curing of the proteins, and the sausage casing can be removed from the mandrel in one piece.

Although the sausage casings discussed are excellent in view of their natural properties, they have the drawback that they cannot be made in any desired length. For the sausage casings must be assembled on the mandrel, and must be dried thereon. Although it is known to make mandrels of relatively arbitrary length (U.S. patent specification No. 3,744,784), in practice a limitation of the length remains, for example in view of the available work space.

The limited length of this kind of sausage casings also brings about technical and economical disadvantages in stuffing. Artificial casings of less natural material, which can be made in any length, can just be connected to the stuffing tube, after which the sausage casing can be pinched off each time a desired length thereof has been stuffed. While sausage casings made of intestines have more natural properties, for stuffing each separate sausage, even if very small, a separate sausage casing must be applied to the stuffing tube of the machine. Thus, the stuffing operation is very labour-consuming and very expensive.

Consequently, there is a need for a process by which this kind of sausage casings can be made in arbitrary length, while preserving the favourable natural properties, and without encountering unsurmountable practical difficulties.

Surprisingly it has now — more than 30 years after the first development of the so-called "stuck casing" — been found that this object can be achieved in an extremely simple way. The invention provides a process for producing sausage casings by joining together strips of thin intestine of pork which have been rendered porous and sticky by a conventional treatment, with overlapping edges on a mandrel, and by drying the assembly on the mandrel, this process being characterized in that at least the edge of the assembly is dried and thereby its stickiness is decreased only to the extent that the intestine material can be moved as a tube along the mandrel, the assembly so obtained being moved to one end of the mandrel, and the operation being repeated, starting at the edge of the assembly stuck together, which is still sticky.

Of course, the operation is repeated as often as is necessary for obtaining a sausage casing of the desired length.

Optionally, sausage casings can be made by the process of this invention from either a single layer of intestine strips, or from two or more layers, or from one layer of intestine strips provided with a coating on the basis of collagen or the like. In the case of sausage casings made up of two or more layers of intestine strips, or of one layer of coated intestine strips, the process is preferably carried out in such a way that in each sticking operation except that last one, only a single intestine layer or an uncoated intestine layer respectively, is present over a short length near the edge of the assembly stuck together, and this strip is used as starting point for the next sticking operation after drying.

During normal drying of sausage casings made up of one or more layers of intestine strips, or of one intestine layer coated with collagen or the like, drying is continued untill the product is completely dry. This causes a crosslinking of protein material, which is often promoted by the addition of an aldehyde, usually formaldehyde, to the intestine material and/or the collagen material, so that the final product is completely cured and is no longer sticky. In the process according to the present invention, it is possible to partially dry the entire piece of sausage casing produced on the mandrel after each sticking treatment and possibly coating treatment, or to completely dry and cure the greater part of this piece, and to partially dry a region at the edge, which serves as "joining stip". The latter possibility can be achieved suitably by protecting the strip concerned during the drying treatment, for example by means of a plastic sleeve. Essential is only that an edge or end strip does not lose its stickiness unduly, so that it can serve as joining strip for sticking the next piece to it.

For partially drying, which leaves the intestine material sufficiently tacky, a time of at least 10 minutes at 100° C is necessary, or a longer time at a lower temperature, such as 1 to 2 hours at 30° C. These conditions are such that substantial curing of the proteins is avoided.

If a sausage casing is made up of one layer of intestine strips and a part of the obtained piece is completely dried and cured after each sticking operation, while a different part along the edge is dried only to the extent that it can be moved along the mandrel while remaining sticky, the length of the part which is dried only partially can of course be chosen rather arbitrarily. The only requirement is that the part which remained sticky can serve as joining strip for sticking the next piece of intestine to it. For this purpose, a length of as little as 0.5 mm can already be sufficient. On the other hand, there is of course no upper limit for the size of the part which remained sticky, because it is also possible to partially dry the entire piece of sausage casing produced for the time being. In actual practice, a choice will have to be made between that possibility and the possibility of partially drying only a narrow joining strip. In the case of the production of sausage casings from two or more layers of intestine strips stuck together, or from one layer of intestine strips coated with collagen or the like, in which a small part at the edge which serves as joining strip consists of a single intestine layer, it is again possible to choose between partially drying the entire piece of sausage casing obtained after each sticking or coating treatment, and between complete drying with the exception of a narrow strip. In the latter case it is of course preferable to select roughly the single layer strip as the region to be partially dried. In that case, the joining strip has a width of preferably at least 1 cm, while on the other hand a single layer strip with a width exceeding 10 cm is unpractical. Generally, a strip width of at least 2 cm and at most 7 cm is most preferred. Of course, the width of the single layer strip need not be identical in every operation, which will generally not be the case in practice anyway, because the sticking is carried out manually.

If the outer layer is a coating on the basis of collagen or the like, the coating material can of course be applied either manually or with a machine. A dipping method can be used for the first coating operation, but for subsequent coating operations this is not very well possible, because the product already pushed down along the mandrel would be coated again. For that reason, subsequent coatings are applied in some other way, such as by brushing or spraying. In that case, it is of course preferable to carry out all coating operations in the same way.

It is also possible to apply a netting between two intestine layers, or between an intestine layer and a coating. To that end, the netting is pushed over the mandrel like a stocking after the first sticking treatment, so that it covers the intestine layer up to a short region joining the strip to be left free, in which the remainder of the stocking-like netting is wrinkled as a working stock. The coating operation or the next sticking operation is then carried out up to that working stock, after which the assembly is pushed along the mandrel and the next piece of intestine layer is stuck to it, after which the netting can be smoothed down over a further length, and the remainder can be wrinkled up as a new working stock. In that way, the work can be continued until the whole of the netting has been used.

If a sausage casing consisting of either more than one intestine layer, or of an intestine layer with a coating is made, it is of course not necessary to leave uncovered a single layer edge during the last sticking operation.

After a sausage casing of the desired length has been obtained, the finished product should of course be dried completely as a final step. If during the previous operations the sausage casing produced has already been dried completely with the exception of narrow strips, it will be sufficient to completely dry the part obtained during the last treatment on the mandrel. If, however, the entire produced piece has been dried only partially during previous operations, the most practical way of proceeding is to dry only partially the piece produced during the last sticking or coating treatment too, after which that piece is pushed along the mandrel and the entire product is removed from the mandrel and is introduced into a suitable drying room, where it may be stretched, if desired. The complete drying and curing then occurs in the manner usual for this kind of products, e.g. for some hours at 40°–100° C.

When using the usual wooden mandrels with a rounded-off end, the usual closed and rounded end of the casing can be produced during the first sticking treatment, but this is not necessary, and since the production of sausage casings of more or less unlimited length is considered here, which casing can be connected to a stuffing machine, and can be stuffed to yield a plurality of sausages of any desired length (with pinches between them), providing one rounded-off and closed end usually offers no particular advantage.

Furthermore, it is advantageous to use for the present process, the tubes provided with apertures which have been disclosed as mandrels for this kind of sausage casings in the U.S. patent specification 3,744,784. In that case, the production of a rounded-off and closed end during the first operation is of course impossible. In that case too, several embodiments are possible. Thus, it is possible to use a helical tube, and in this way very long helical sausage casings can be made, which can be used as substitutes for "beef rounds" and the like. Also, it is possible with these hollow tubes, to carry out the drying from inside by means of hot air. Further, if a mandrel according to the above U.S. patent specification in the form of a tube or hose is provided or mounted respectively with a bend, the finished part of the casing after each drying operation can be moved approximately to that bend, such that the joining strip which is still sticky is situated just before the bend.

Since the development of stuck intestines, pig guts have usually been used as intestine material. For the present process too, this is the most common material, but as is the case with the known processes, the present process is not limited thereto either. In particular, it should be remarked that the "beef rounds", which by themselves do not have a good an adhesive power as pig guts, nevertheless can be used for those embodiments where netting is applied. Exactly because the present process allows a broader choice of shapes and lengths of sausage casings to be made, the use of such alternative materials becomes truly interesting for the first time.

Figure 2:
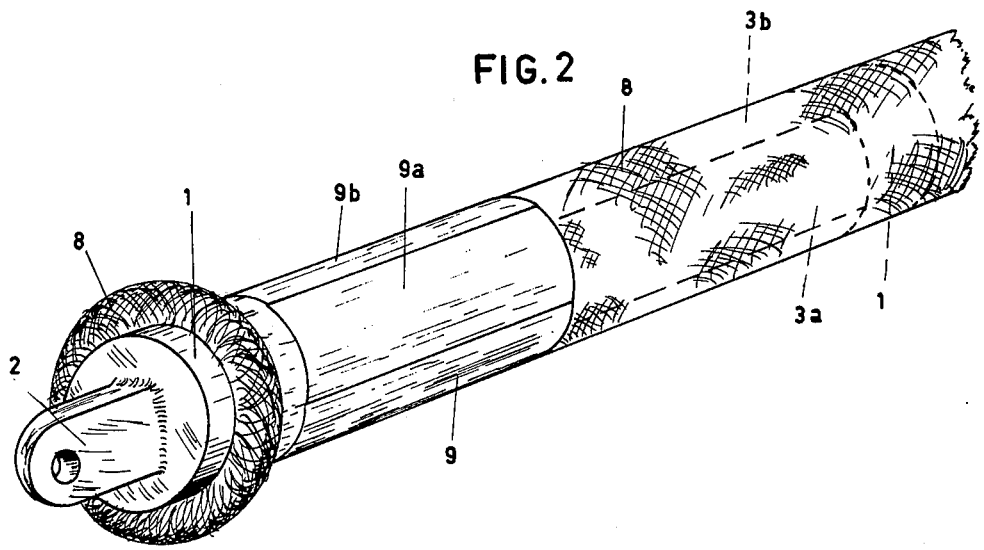

The invention will be better understood by reference to the accompanying drawings, wherein:

FIG. 1 shows in a general way an embodiment, wherein a sausage casing is made from a single layer of intestine strips; and FIG. 2 shows an embodiment, wherein a casing is made from two layers of intestine strips with a netting between them.

In the figures identical numerals refer to identical parts.

As shown in FIG. 1, the mandrel 1 is used for assembling the sausage casing. During operation the mandrel is rotatably clamped with its end 2 in a suitable clamping device (not shown). The intestine strips 3, 3a, and 3b have been laid on the mandrel with overlapping longitudinal edges, and adjoining thereto, also with mutual overlappings and overlappings with the former strips, the intestine strips 4, 4a, and 4b have been applied. Although for simplicity's sake only two sets of strips over the length of the mandrel have been indicated having a regular form, it is obvious that a large number of strips can be necessary, depending on the intestine material and on the length and width of the mandrel, and it will also be obvious that in actual practice the strips are not regular in shape as indicated in the drawing, but being a natural material will be irregularly shaped.

The strips 3, 3a and 3b and the strips 4, 4a and 4b overlap each other in the edge 5. The assembly of strips on the mandrel has been completely dried, apart from a relatively narrow edge 6 which is still sticky.

The sticking treatment illustrated in FIG. 1 is an intermediate stage of the production of the sausage casing. A part of the casing has already been completed and moved from the mandrel, as shown with 7. After the assembly now on the mandrel will have been moved towards the end thereof, the joining strip 6 will be used as starting point for the next sticking operation.

In FIG. 2 the embodiment in which a netting is used, is indicated. Again some parts have been omitted for greater clarity. On the mandrel 1, at the end removed from the part 2, intestine strips 3a and 3b have been assembled. Over this assembly the netting 8 has been drawn. The netting has been covered again with a second intestine layer which has been indicated at the other end of the mandrel with 9, 9a and 9b. Of course, instead of a second intestine layer a proteinaceous coating can also be used. At the end of the stuck part the netting 8 has been wrinkled up as working stock. On the other side of this stock a single intestine layer is present, just like the edge 6 in FIG. 1, but in order to show here that the single layer is actually transparent so that the mandrel 1 can be seen through it, this single layer has not been indicated separately.

In the stage shown in FIG. 2 the assembly on the mandrel still has to be dried, and in this case one can for example dry the entire assembly only partially so that it can be moved over the mandrel, but is still sticky.

Thus, the invention for the first time makes it possible to produce sausage casings of the known natural quality in practically any desired length, which has already been possible for sausage casings made from a more artificial basis, such as tubular casings prepared from collagen with or without a reinforcement of fibrous material.

While other modifications of the invention and variations thereof which may be embraced within the scope of the invention have not been described, the invention is intended to include such as may be embraced within the following claims:

What is claimed is:

1. A process for producing sausage casings of any desired length by joining together strips of intestine which have been rendered porous and sticking by a conventional pretreatment, with overlapping edges on a mandrel, having an upstream and a downstream end comprising applying strips of intestine with overlapping edges about the circumference of the mandrel to stick the overlapping edges together;

partially drying the stuck product and decreasing its stickiness to the extent that the intestine material can be moved along the mandrel from the upstream end to the downstream end as a tube while maintaining at least the trailing end of the stuck product sticky;

moving the obtained product to the downstream end of the mandrel;

applying further strips of intestine with overlapping edges about the circumference of the mandrel and over the end of the stuck piece which is still sticky to stick the overlapping edges and ends together;

drying completely at least the overlapping ends stuck together and all undried portions preceding the overlapped ends, the portion of the casing on the mandrel being dried to the extent that the casing can be moved as a tube to the downstream end of the mandrel, while maintaining at least the trailing end of the casing sticky;

moving the casing to the downstream end of the mandrel;

repeating the strip application and drying steps; and after the desired length of casing has been obtained the still sticky part thereof is dried completely.

2. Process according to claim 1 for producing sausage casings of any desired length from a layer of intestine strips with thereon a material chosen from the group consisting of a second layer of intestine strips and a coating of proteinaceous material, wherein during each sticking operation, except the last, a strip of single intestine layer is made over a short distance at the edge of the piece obtained by sticking, which strip is used as joining strip for the next sticking operation after the drying on the mandrel.

3. Process according to claim 2 for producing sausage casings of any desired length from a layer of intestine strips, a netting on this layer, and on this netting a material chosen from the group consisting of a second layer of intestine strips and a proteinaceous coating, wherein in each sticking operation, except the last, first a layer of intestine strips is stuck to each other, then the netting is smooth down over the stuck part up to a short distance from the edge, where the remaining netting is wrinkled up, after which the upper layer chosen from the group consisting of a second intestine layer and a proteinaceous coating is applied up to the wrinkled part of the netting and the edge of the stuck intestine strips, after which the drying is carried out.

4. A process according to claim 2, wherein in each sticking operation, except the last, a joining strip of 2 cm to 7 cm is left free.

5. A process according to claim 3, wherein in each sticking operation, except the last, a joining strip of 2 cm to 7 cm is left free.

6. A process according to claim 1, wherein the various operations are carried out on a mandrel in the form of a tube or hose having a bend, each sticking operation being carried out at the same side of the bend, and after each partial drying operation the finished part being moved so far that only the region serving as joining strip is still situated at that side of the bend.

7. A process according to claim 2, wherein the various operations are carried out on a mandrel in the form of a tube or hose having a bend, each sticking operation, and, if applicable, coating operation being carried out at the same side of the bend, and after each partial drying operation the finished part being moved so far that only the region serving as joining strip is still situated at that side of the bend.

8. A process according to claim 3, wherein the various operations are carried out on a mandrel in the form of a tube or hose having a bend, each sticking operation, and, if applicable, coating operation being carried out at the same side of the bend, and after each partial drying operation the finished part being moved so far that only the region serving as joining strip and the wrinkled part of the netting are still situated at that side of the bend.

* * * * *